Figure 1:
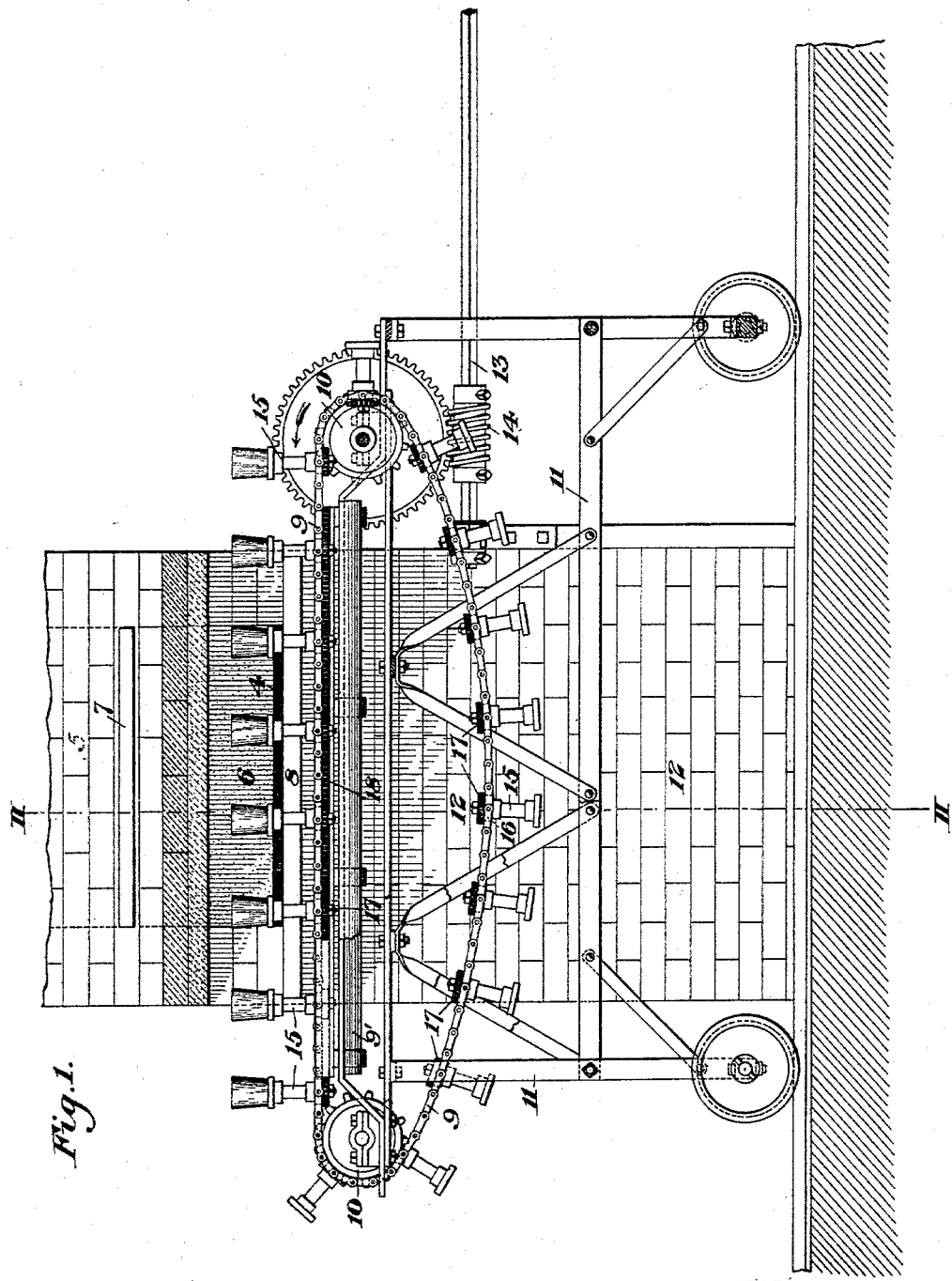

(No Model.) 2 Sheets—Sheet 1.
A. R. LAZURE & J. J. DENNING.
APPARATUS FOR REHEATING GLASSWARE.
No. 593,108. Patented Nov. 2, 1897.

(No Model.) 2 Sheets—Sheet 2.
A. R. LAZURE & J. J. DENNING.
APPARATUS FOR REHEATING GLASSWARE.
No. 593,108. Patented Nov. 2, 1897.
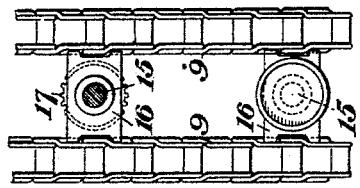
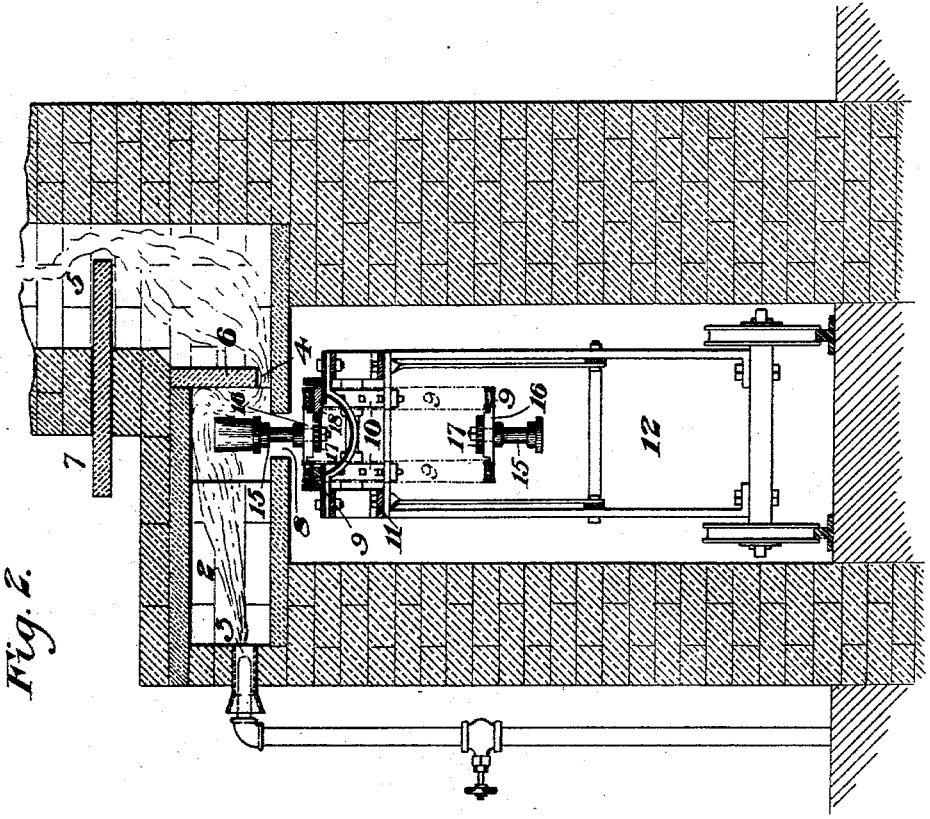

UNITED STATES PATENT OFFICE.

ALBERT RILEY LAZURE AND JAMES JOHN DENNING, OF GAS CITY, INDIANA, ASSIGNORS TO THE UNITED STATES GLASS COMPANY, OF PITTSBURG, PENNSYLVANIA.

APPARATUS FOR REHEATING GLASSWARE.

SPECIFICATION forming part of Letters Patent No. 593,108, dated November 2, 1897.

Application filed June 1, 1897. Serial No. 638,981. (No model.)

*To all whom it may concern:*

Be it known that we, ALBERT RILEY LAZURE and JAMES JOHN DENNING, of Gas City, in the county of Grant and State of Indiana, have invented a new and useful Improvement in Apparatus for Reheating Glassware, of which the following is a full, clear, and exact description, reference being had to the accompanying drawings, forming part of this specification, in which—

Figure 1 is a sectional side elevation of our improved reheating apparatus. Fig. 2 is a cross-sectional view on the line II II of Fig. 1, and Fig. 3 is a detail of a part of the conveyer-chain or carrier for the glass articles.

The object of our invention is to provide means for the reheating of glassware for the purpose of enabling the same to be finished by suitable molds, shaping devices, or other mechanism.

As shown in the drawings, the glory-hole in which the glass articles are heated consists of a covered chamber 2, having a gas or oil burner 3, with suitable air-inlets for the heating gases or flame, and an outlet 4, leading at the base of the chamber into the stack 5, under a wall or partition 6.

7 is a damper which may be provided in the stack.

The glass articles are moved transversely across the chamber 2 on carriers or supports which extend through a transverse slot 8 in the floor or tile which constitutes the bottom of the chamber, and, as shown in the drawings, the flame from the burner 3 passes over and around the glass articles and descends on the far side thereof through the passage 4, the glass articles meanwhile being rotated, so as to be subjected uniformly on all sides to the heating action of the flame.

The carrier for the glass articles consists of endless chains 9 9, passing around sprockets 10 10 at the ends of a frame 11, which frame is mounted upon wheels or is otherwise movable, so that it may be advanced into the space 12 beneath the chamber 2 or may be withdrawn therefrom when desired for any purpose. On the frame 11, below the upper branch of the endless chain, is a trough or plate 9', which not only serves to prevent a direct draft of air through the opening 8 into the chamber, but also collects any glass which may be broken and enables it to be removed easily.

The sprocket-wheels on the frame are driven by suitable gearing, such as a shaft 13, having a traveling connection with a worm 14 on the frame, so that the frame can be drawn back and forth without disturbing the driving mechanism. The supports for the glass articles consist of standards 15, mounted upon blocks 16, fixed to the links of the chain and rotatory within said blocks, and below the blocks the ends or stems of the standards are fitted with pinions 17, meshing with a rack 18 on the frame, so that as the standards are moved along with the chains they will be rotated and the glass articles turned thereby. The tops of these standards upon which the glass articles rest are substantially flat, having merely a shallow rim to keep the articles from slipping off. The consequence is that when the articles are in the heating-chamber they are surrounded by the products of combustion, and all parts thereof except the bottom are exposed to the flame and are not marred by contact with metal surfaces. Neither the inner nor outer sides are in contact with the supports, but merely the bottom, and we thus avoid the streaks which disfigure articles held laterally by supports or snaps in such reheating-chambers; nor is the bottom disfigured by the marks which are left by the sticking-up punties commonly used for reheating glassware.

The operation is as follows: The frame having been advanced into the space 12 beneath the chamber 2, as shown in Fig. 1, the sprocket-wheels of the frame are driven, and as the standards move onward the glass articles to be heated are placed thereon and are carried through the chamber, being turned slowly as they travel by rotation of the supports. In this way a whole series of glass articles is carried through the chamber, in which they receive the heating action of the flame, and as they emerge at the opposite side in a heated condition they are taken off one by one and are shaped in the finishing or shaping apparatus.

The advantages of our invention will be appreciated by those skilled in the art.

The apparatus affords convenient and effective means for reheating tumblers, which can be placed on the supports as they are taken from the mold, reheated, and immediately placed in the finishing apparatus, all without involving any unnecessary delay. A great saving of labor is thus effected.

A special feature of advantage of our invention is that the glass articles to be heated pass through a chamber in which they are surrounded by the heated gases, and the outlet for the gases is on the far side and at the base of the chamber at the bottom of the side wall 6. The consequence is that when the flame strikes the partition-wall it is reverberated upon the article, and its heating action is thereby intensified and made more uniform.

A further point of advantage arises from the fact that the passage through which the articles travel is straight from end to end, so that the articles are at no time hidden from view, and the condition of the furnace and its action upon the articles can at any time be noted and readily controlled by adjustment of the gas-valves.

The use of the movable frame on which the endless carrier is supported is also of merit, because if the apparatus should get out of repair—for example, if one of the tumblers should melt down by reason of too great heat and should clog the gearing—the frame can be drawn out quickly and the parts repaired, whereas if the carrier were built on a stationary frame it would be necessary in case of such accident to put out the fire and to allow the furnace to cool before repairs could be made. It is also useful to enable the carrier to be drawn out from the heating-chamber when it is not in use, for if the chain were stopped and allowed to remain in the chamber exposed to the heat it would rapidly be destroyed.

We claim—

1. In apparatus for reheating glassware, a heating-chamber having a straight transverse opening extending through its floor and having an outlet at the side for the products of combustion, a carrier traveling along the chamber for carrying the glass articles, and mechanism adapted to rotate the glass articles as they travel through the chamber.

2. In apparatus for reheating glassware, a heating-chamber having a transverse opening, a carrier having supports extending into the chamber and carrying the glass articles, said chamber being open on one side to the flame and having at the lower part of the other side an outlet-passage for the products of combustion, whereby the gases are caused to encircle the article to be heated, and mechanism adapted to rotate the supports.

3. In apparatus for reheating glassware, a heating-chamber open on one side to the flame and having at the lower part of the other side an outlet-passage for the products of combustion, whereby the gases are caused to encircle the articles to be heated.

4. Apparatus for reheating glassware, having a heating-chamber, a frame movable into and out of the chamber, a carrier mounted on said frame and adapted to move and carry glass articles while the frame itself is stationary, and driving-gear for the carrier.

5. In apparatus for reheating glassware, a heating-chamber having a transverse opening, a carrier having supports extending into the chamber for carrying the glass articles, and a frame on which said carrier is mounted, said frame being movable into and out of position below said chamber.

6. In apparatus for reheating glassware, a heating-chamber, and a carrier having supports on which the glass articles are carried through the chamber in an upright position, exposed on all sides to the gases, said supports being adapted to make contact with the article only on the bottom surface, whereby the article is heated throughout and is not marred by contact with metal.

In testimony whereof we have hereunto set our hands.

ALBERT RILEY LAZURE.
JAMES JOHN DENNING.

Witnesses:
ROSS MCCUNE,
A. E. JACKSON.